United States Patent [19]

Binnewies et al.

[11] Patent Number: 5,247,217

[45] Date of Patent: Sep. 21, 1993

[54] SAFETY SYSTEM FOR A STEPPER-MOTOR DRIVE

[75] Inventors: Ludwig Binnewies, Lappersdorf; Udo Frinzel, Oberkotzau; Hans Schreiber, Lappersdorf; Herbert Zimmer, Regensburg, all of Fed. Rep. of Germany; Andreas Noichl, Vienna, Austria; Manfred Trefalt, Vienna, Austria; Roman Turba, Vienna, Austria

[73] Assignee: Siemens Aktiengesellschaft, Munich, Fed. Rep. of Germany

[21] Appl. No.: 889,508

[22] Filed: May 27, 1992

Related U.S. Application Data

[63] Continuation-in-part of PCT/EP90/02002 filed Nov. 23, 1990, abandoned

[30] Foreign Application Priority Data

Nov. 28, 1989 [EP] European Pat. Off. ........ 89121926.3
Aug. 3, 1990 [DE] Fed. Rep. of Germany .................. G.9012436.7U

[51] Int. Cl.$^5$ ................... H02K 37/00; H02P 8/00
[52] U.S. Cl. .................... 310/49 R; 310/19 J; 318/696
[58] Field of Search ............... 318/685, 696, 683, 672; 361/23, 29, 30, 31; 310/49 R, 162, 180, 184, 185, 195, 257, 68 R; 322/52, 62, 65, 99; 324/546, 158 MG

[56] References Cited

U.S. PATENT DOCUMENTS 4,548,176 10/1985 Ishida et al. .

FOREIGN PATENT DOCUMENTS 0313659 5/1989 European Pat. Off. .

OTHER PUBLICATIONS

Patent Abstracts of Japan, vol. 11, No. 347 (M-641) [2794] Nov. 13, 1987.

Primary Examiner—Steve L. Stephan
Assistant Examiner—Ed To
Attorney, Agent, or Firm—Herbert L. Lerner; Laurence A. Greenberg

[57] ABSTRACT

In a safety system for a stepper-motor drive, a stepper motor for operating a throttle valve has poles with windings. Each pole winding is divided into part-windings, each of which is driven by a dedicated output stage. As a result, in the event of a failure of a part-winding or an output stage, it remains possible to control the stepper motor.

12 Claims, 3 Drawing Sheets

SAFETY SYSTEM FOR A STEPPER-MOTOR DRIVE

CROSS-REFERENCE TO RELATED APPLICATION

This application is a Continuation of International Application Ser. No. PCT/EP90/02002, filed Nov. 23, 1990, now abandoned with respect to the DO/US.

Specification

The invention relates to a safety system for a stepper-motor drive, in particular in a motor vehicle, including a two-phase stepper motor with two windings, each of the windings being distributed on at least two poles, and a controller and an output stage configuration for adjusting currents through the windings.

In a so-called electric accelerator, a throttle valve is operated by an electric motor, for example a two-phase stepper motor. The latter works upon opening of the throttle valve against the force of a spring. A current through the individual windings of the stepper motor is adjusted through a controller and a respectively assigned output stage in such a way that a rotating field is produced for moving the stepper motor.

If an electrical fault occurs in the stepper motor or in one of the output stages or in a connecting line, the rotating field can no longer be correctly controlled. The controller is then switched off, and the spring draws the thus de-energized motor into a position which corresponds to the closed position of the throttle valve.

In the event of such a fault, the throttle valve is thus closed and can then no longer be further operated. The motor vehicle can thus not be reused until after repair.

It is accordingly an object of the invention to provide a safety system for a stepper-motor drive, which overcomes the hereinafore-mentioned disadvantages of the heretofore-known devices of this general type and which maintains operability in the event of a fault.

With the foregoing and other objects in view there is provided, in accordance with the invention, a safety system for a stepper-motor drive, especially in a motor vehicle, comprising a two-phase stepper motor with poles and two windings, each of the windings being distributed on at least two of the poles and each of the windings being subdivided into at least two part-windings, an output stage configuration and a controller connected to the output stage configuration for adjusting currents through the windings, the output stage configuration having dedicated output stages each being connected to a respective one of the part-windings, the controller adjusting current through each of the part-windings during normal operation for producing a nominal torque as a sum of component torques, a monitoring device connected to the output stage configuration and to the controller for monitoring functioning of the individual part-windings and for transmitting an alarm signal to the controller in the event of failure of one of the part-windings, and in the presence of the alarm signal, in emergency operation in which a given one of the windings has a failed part-winding and a remaining part-winding, the controller controlling current through the remaining art-winding for at least partly taking over the function of the failed part-winding with the remaining part-winding.

In the event of the failure of only one winding of a two-phase stepper motor, operation thereof is also no longer fully guaranteed. It could then be conceivable to provide a second, redundant stepper motor which takes over the function of the first stepper motor, in the event of the failure thereof. However, such a solution is very complicated and expensive.

In addition, the increased number of components (for example bearings) effects a lower reliability, since the failure of only one bearing can block the entire configuration.

The solution according to the invention therefore opts for a different structure, namely to divide the stepper motor quasi-internally into separate section motors. For this purpose, each winding of the stepper motor is subdivided into two or more part-windings. Each of the part-windings is assigned a dedicated output stage.

Given two such part-windings, for example, it is then possible, in the event of a failure of one of the part-windings or of the output stage assigned to it, for the remaining part-winding to at least partially take over the function.

The part-windings and their control currents can be dimensioned in such a way that the nominal torque required in normal operation of the motor is respectively applied at each pole by one part-winding. In other words, a genuine redundancy occurs due to the respective second part-winding.

However, the dimensioning can also be provided in such a way that it is only the sum of the resulting component torques of all of the part-windings that corresponds to the required nominal torque. It is true, in this case, that in the event of a failure of one of the part-windings, a certain dynamic range is lost in the controllability of the stepper motor, but the controllability is maintained per se. However, this dynamic loss can be avoided when the current through the remaining intact part-winding on a pole is increased in such a way that the effect of the failed part-winding is thereby completely or partially compensated.

Many possibilities are conceivable for the dimensioning and the configuration of the individual part-windings. The winding numbers can, for example, be equal or unequal. Consequently, the associated control currents are then also equal or unequal.

In accordance with another feature of the invention, each of the windings has at least two part-windings located on the same poles.

In accordance with a further feature of the invention, one of the windings has at least two part-windings located on different poles.

In accordance with an added feature of the invention, each of the part-windings is identical.

In accordance with an additional feature of the invention, the part-windings are wound in the same sense on each pole and are located next to one another.

In accordance with yet another feature of the invention, the part-windings are wound above one another in the same sense onto each pole.

In accordance with yet a further feature of the invention, in normal operation only one of the part-windings of each given one of the windings is supplied with current, and in the event of its failure a different part-winding of the given winding takes over its function in emergency operation.

In accordance with a concomitant feature of the invention, in normal operation all of the part-windings of one of the windings are supplied with current, and in emergency operation the others of the part-windings are supplied with an increased current, so that they compensate for the effect of a failed part-winding.

The monitoring device monitors each part-winding for failure, for example by checking whether or not a current is flowing through a part-winding when the associated output stage is driven by the controller. In the event of a failure, it generates an alarm signal and passes this on to the controller of the stepper motor. The controller thereupon alters the level of the current through the remaining part-winding on the pole having the failed part-winding, so that the effect thereof is compensated.

Other features which are considered as characteristic for the invention are set forth in the appended claims.

Although the invention is illustrated and described herein as embodied in a safety system for a stepper-motor drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
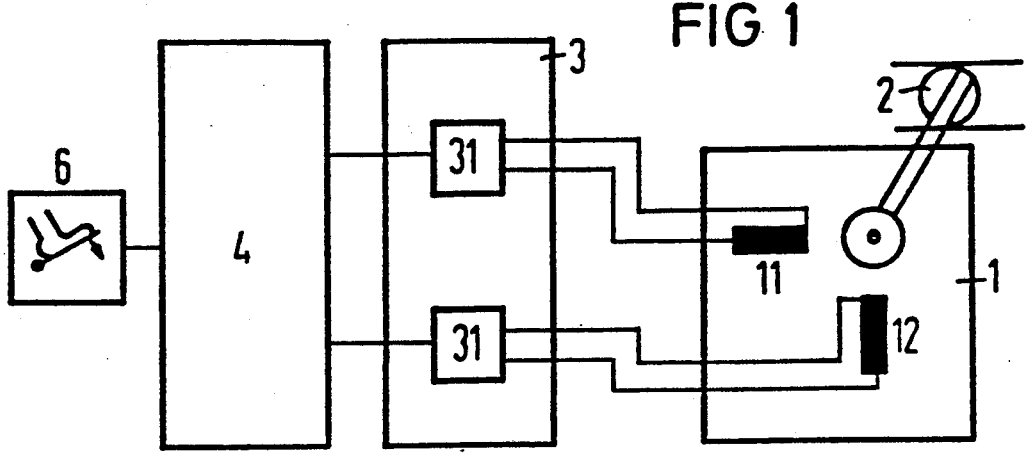
FIG. 1 is a diagrammatic and schematic block circuit diagram of an electric accelerator having a stepper-motor drive according to the prior art.

Referring now to the figures of the drawing in detail and first, particularly, to FIG. 1 thereof, there is seen an electric accelerator for a vehicle having a gas pedal 6, a controller 4, an output or end stage configuration 3, a stepper motor 1 and a throttle valve 2. The throttle valve 2 is seated directly on a shaft of the stepper motor 1. The stepper motor 1 has two phases and two windings 11, 12, each of which is supplied with current from a dedicated output stage 31 of the output stage configuration 3.

A driver determines an angular position of the throttle valve 2 through a position of the gas pedal 6. This position is fed as an electrical signal to the controller 4, which drives the output stage configuration 3 in accordance therewith. The currents through the windings 11, 12 are then adjusted through the individual output stages 31 in such a way that the desired angular position of the stepper motor 1 and thus of the throttle valve 2 connected to it is produced.

Figure 3:
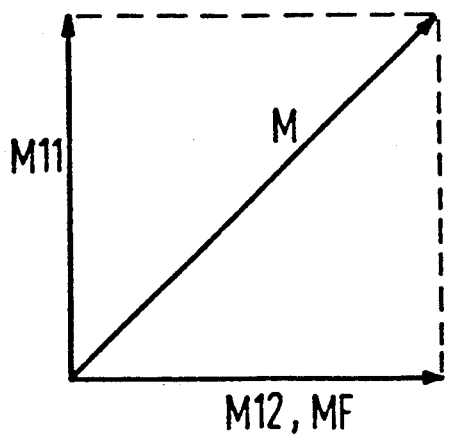
FIG. 3 is a vector diagram of torques for normal operation and emergency operation of the stepper-motor drive according to FIG. 1.

Plotted in FIG. 3 is an example for normal operation in which the windings 11, 12 are supplied uniformly with current from their respective output stages 31. In this case, resulting component torques or moments M11 and M12 of the two windings 11, 12 produce a nominal torque or moment M and the rotatable part of the stepper motor is aligned in accordance with the direction thereof.

It may then be assumed, for example, that the winding 11 fails, which can be occasioned either by an electrical fault in the winding 11 itself, or in the output stage 31 driving it, or in the lead. In accordance with FIG. 3, a torque MF for such a failure is then equal to the component torque M12. As soon as the stepper motor has aligned itself in accordance with the new torque MF, it can no longer be moved out of that new position, since it is possible through the winding 12 to alter the torque MF only with respect to amounts but no longer with respect to direction.

Such a case of a fault also represents a safety-critical state. Depending on which of the two windings 11, 12 fails, the stepper motor suddenly draws the throttle valve 2 in the direction of the remaining torque. If the remaining torque is smaller than the spring restoring torque, that can mean a sudden closure of the throttle valve, and can thus be very dangerous depending on the traffic situation.

Figure 2:
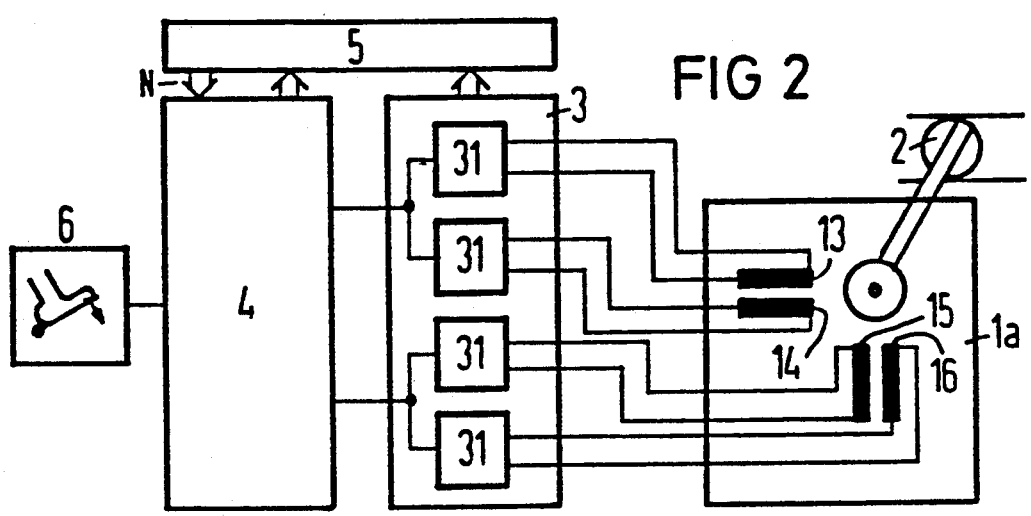
FIG. 2 is a diagrammatic and schematic block circuit diagram of an electric accelerator having a stepper-motor drive according to the invention.

FIG. 2 represents an electric accelerator having a stepper-motor drive according to the invention. The same parts in FIG. 2 are provided with the same reference symbols as in FIG. 1. In this case the winding 11 of FIG. 1 is replaced by two part-windings 13 and 14, each of which is driven by a dedicated output stage 31. The winding 11 of FIG. 1 is likewise replaced by part-windings 15 and 16.

Figure 5:
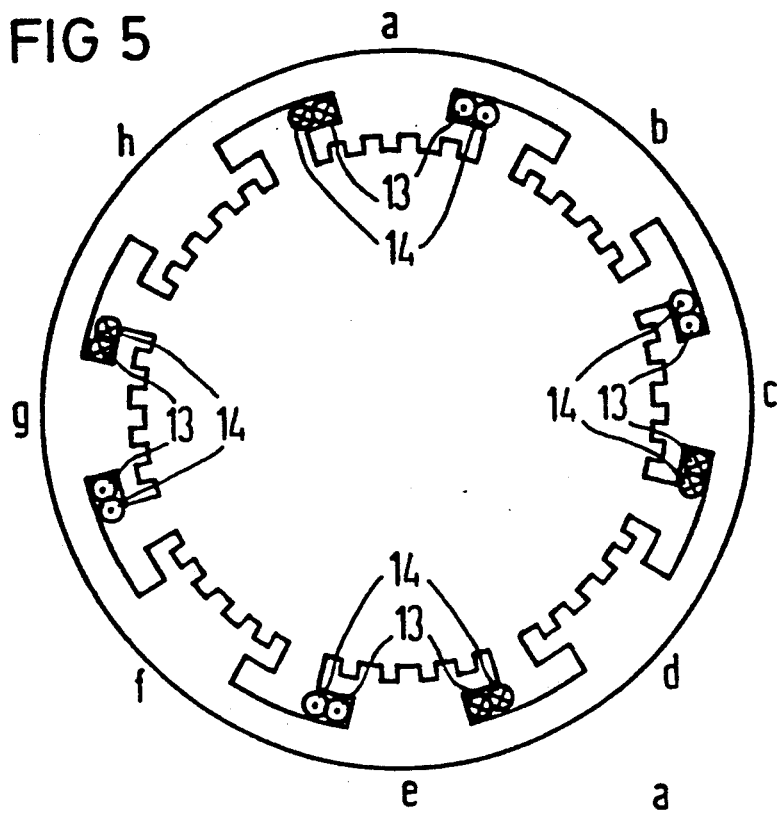
FIGS. 5, 6 and 7 are sectional views each snowing an embodiment of a configuration of part-windings.
Figure 6:
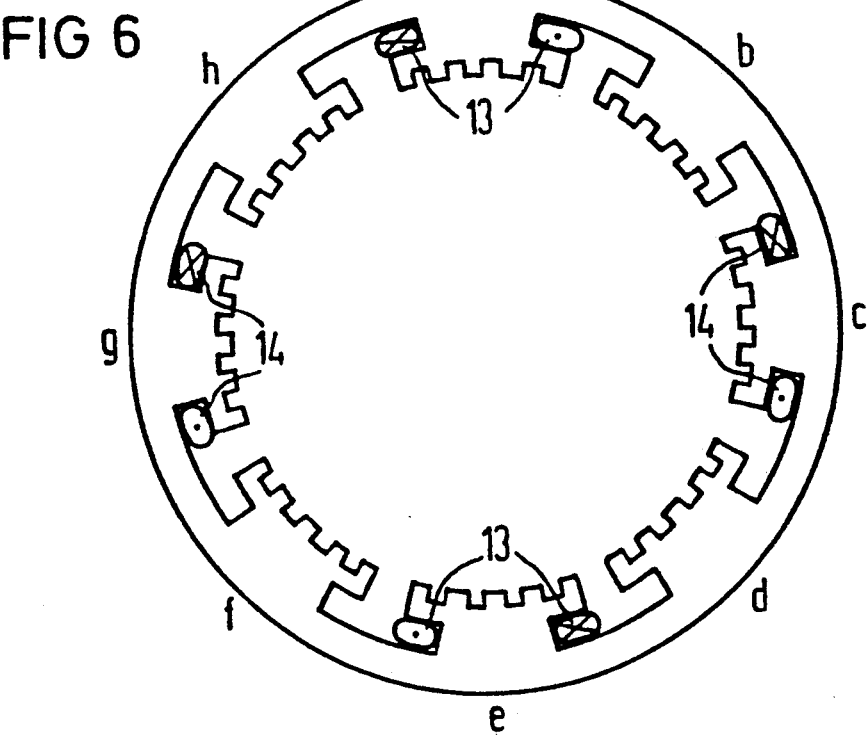
Figure 7:
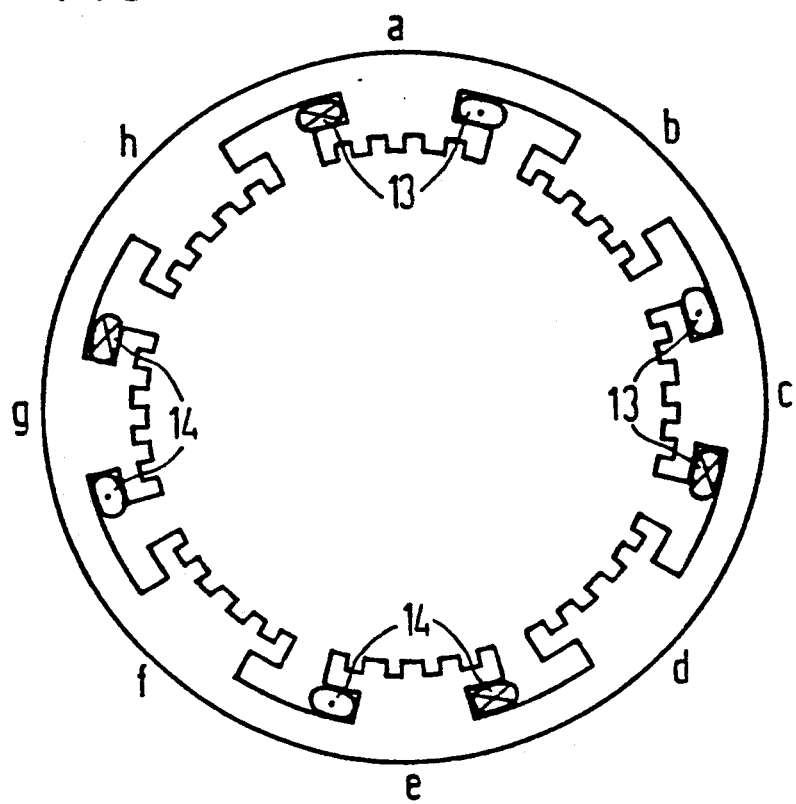

Three exemplary embodiments of possible configurations of the part-windings 13-16 on poles of a stator of a stepper motor 1a of FIG. 2 are represented in FIGS. 5, 6 and 7. In this regard, the stator of the stepper motor 1 has eight poles a-h in each case. In this case, for the sake of clarity, it is only the part-windings 13 and 14, which replace the winding 11 of FIG. 1, that are represented on the poles a, c, e and g. The part-windings 15 and 16 that are omitted are disposed analogously on the poles b, d, f and h.

According to FIG. 5, in each case, individual pole windings of the part-windings 13 and 14 are disposed in such a way as to be electrically insulated from one another on the same poles. As is also the case in FIGS. 6 and 7, connecting lines between the individual poles are not shown.

In this embodiment, however, there is an electromagnetic coupling of the two part-windings 13 and 14. This coupling leads to mutual influencing of the respectively assigned output stages 31, since the two part-windings 13, 14 are penetrated by the same magnetic flux. Small stray fluxes are not taken into account.

In accordance with a second embodiment show in FIG. 6, the part-winding 13 is distributed to the poles a and e, and the part-winding 14 is distributed to the poles c and g. This spatial separation effects a reduction in the mutual influencing.

Finally, a preferred embodiment according to FIG. 7 effects an almost complete reduction in the mutual influencing. In this case, the part-winding 13 is located on the poles a and c, and the part-winding 14 is located on the poles e and g. Consequently, the right-hand, upper half of the stepper motor 1a is taken into account magnetically by the part-winding 13, and the left-hand, lower half by the part-winding 14. The part-windings 13 and 14 are thus largely decoupled magnetically.

The part-windings 13 and 14 have the same number of windings and the same winding sense. The same holds, in turn, for the part-windings 15 and 16. Each of the part-windings 13-16 and their control currents are dimensioned in such a way that in each case they produce 50% of the component torque of one of the windings 11, 12 of FIG. 1.

Figure 4:
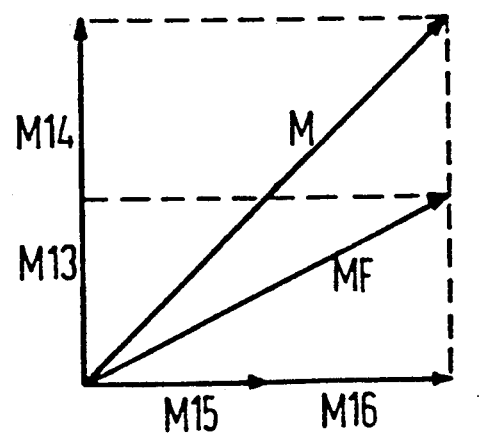
FIG. 4 is a vector diagram of torques for normal operation and emergency operation of the stepper-motor drive according to FIG. 2.

As FIG. 4 shows, in normal operation this leads to the same nominal torque M as in FIG. 3.

On this occasion, for the case of a fault, it may be assumed that the part-winding 14 fails. According to FIG. 4, the failure of the component torque M14 results in the new torque MF for this case of fault. The controllability of the stepper motor 1a is therefore retained, since the torque MF can be further changed with respect to direction by the remaining part-winding 13. Only the dynamic range is restricted by the failure of the component torque M14.

A safety-critical response, which occurs in the prior art, therefore does not occur with the stepper-motor drive according to the invention. Firstly, in the case of a fault it is always only a specific change in the amount of the angular position of the throttle valve 2 that occurs and never a sudden closure. Secondly, the driver can react to this change with respect to amount in the angular position of the throttle valve 2, since it continues to remain controllable through the ga pedal 6.

A monitoring device 5 is connected to the output stage configuration 3 and the controller 4. The monitoring device 5 receives information from the output stage configuration 3 relating to the current flows in the leads between the end stages 31 and the associated part-windings 13 to 16. It receives information from the controller 4 relating to the control signals which the controller 4 emits to all of the individual output stages 31.

The monitoring device 5 checks whether or not the respective control signals for the output stages 31 effect a corresponding flow of current through one of the part-windings 13–16. If this is not the case in one of the part-windings 13–16, a fault is present either in the associated output stage 31, the part-winding 13–16 or the lead.

In this case of a fault, the monitoring device 5 generates an alarm signal N and passes the latter on to the controller 4. This alarm signal N contains the information which affects the part-windings 13–16.

The controller 4 then carries out an emergency operation. For example, in the case of the fault mentioned above, where the part-winding 14 is defective, this causes the output stage 31 assigned to the part-winding 13 to supply the part-winding 13 with a current that is twice as high as in normal operation. Due to the component torque M13 being doubled in such a way, the effect of the failed part-winding 14 is compensated.

The functions of the controller 4 and of the monitoring device 5 are taken over by a computer having an appropriate input and output circuit. The interrogation of the individual part-winding currents to the part-windings 13–16 is performed in each case through a current measurement on the corresponding lead.

We claim:

1. A safety system for a stepper-motor drive, comprising:
    a two-phase stepper motor with poles and two windings, each of said windings being distributed on at least two of said poles and each of said windings being subdivided into at least two part-windings,
    an output stage configuration and a controller connected to said output stage configuration for adjusting currents through said windings,
    said output stage configuration having output stages each being connected to a respective one of said part-windings,
    said controller adjusting current through each of said part-windings during normal operation for producing a nominal torque as a sum of component torques,
    a monitoring device connected to said output stage configuration and to said controller for monitoring functioning of said individual part-windings and for transmitting an alarm signal to said controller in the event of failure of one of said part-windings, and
    in the presence of the alarm signal, in emergency operation in which a given one of said windings has a failed part-winding and a remaining part-winding, said controller controlling current through said remaining part-winding for at least partly taking over the function of said failed part-winding with said remaining part-winding.

2. The safety system according to claim 1, wherein said stepper motor is in a motor vehicle.

3. The safety system according to claim 1, wherein each of said windings has at least two part-windings located on the same poles.

4. The safety system according to claim 1, wherein one of said windings has at least two part-windings located on different poles.

5. The safety system according to claim 3, wherein each of said part-windings is identical.

6. The safety system according to claim 4, wherein each of said part-windings is identical.

7. The safety system according to claim 3, wherein said part-windings are wound in the same sense on each pole and are located next to one another.

8. The safety system according to claim 3, wherein said part-windings are wound above one another in the same sense onto each pole.

9. The safety system according to claim 3, wherein in normal operation only one of said part-windings of each given one of said windings is supplied with current, and in the event of its failure a different part-winding of said given winding takes over its function in emergency operation.

10. The safety system according to claim 4, wherein in normal operation only one of said part-windings of each given one of said windings is supplied with current, and in the event of its failure a different part-winding of said given winding takes over its function in emergency operation.

11. The safety system according to claim 3, wherein in normal operation all of said part-windings of one of said windings are supplied with current, and in emergency operation the others of said part-windings are supplied with an increased current, so that they compensate for the effect of a failed part-winding.

12. The safety system according to claim 4, wherein in normal operation all of said part-windings of one of said windings are supplied with current, and in emergency operation the others of said part-windings are supplied with an increased current, so that they compensate for the effect of a failed part-winding.

* * * * *